May 22, 1945.  E. F. MARTINEC  2,376,372
GAUGING DEVICE
Filed March 15, 1943  2 Sheets-Sheet 1

Inventor
Eugene F. Martinec
By Wooster & Davis
Attorneys

May 22, 1945.  E. F. MARTINEC  2,376,372
GAUGING DEVICE
Filed March 15, 1943  2 Sheets-Sheet 2

Inventor
Eugene F. Martinec
By Wooster & Davis
Attorneys

Patented May 22, 1945

2,376,372

UNITED STATES PATENT OFFICE 2,376,372

GAUGING DEVICE

Eugene F. Martinec, Cleveland, Ohio

Application March 15, 1943, Serial No. 479,243

3 Claims. (Cl. 33—148)

This invention relates to gauging devices, and has for an object to provide a construction which will permit much faster and more accurate gauging of round parts when they are fed under the gauging member, both in hand and automatic feeding of these parts to the gauging position.

It is also an object to provide a construction and arrangement which is more accurate and less tiring on the operator in hand feeding of the articles to the gauging position, but which also makes it possible for automatic accurate feeding by mechanical means of the articles to the gauging position.

A further object is to provide a construction and arrangement in which for accurate gauging it is not necessary that the article to be gauged be positioned in exact position in alignment with the gauging member, but which will give an accurate reading even when the article is somewhat out of alignment with the gauging member.

This device is especially adapted for use in such gauging devices as are disclosed in my copending applications filed of even date herewith, Serial Nos. 479,239, 479,240, 479,241, and 479,242; and Serial No. 479,430, filed March 17, 1943, and designated Cases A, B, C, D and E. When used with such devices it may be built into or incorporated as a part of the gauging unit, and could be mounted in the housing of such unit. It would greatly facilitate accurate gauging by such units. It is by no means limited to use with such devices, but may be employed with numerous other gauging devices.

With the foregoing and other objects in view I have devised the construction illustrated in the accompanying drawings forming a part of this specification. It is, however, to be understood that the invention is not limited to the exact details and arrangement shown, but may involve various changes and modifications within the scope of the invention.

Figure 2:
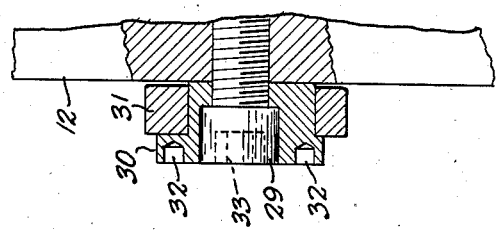
Fig. 2 is a section substantially on line 2—2 of Fig. 1, and Figs. 3 to 8 inclusive are diagrammatical views illustrating various positions a work piece may take in the new arrangements, and showing a comparison of errors which might be involved.
Figure 1:
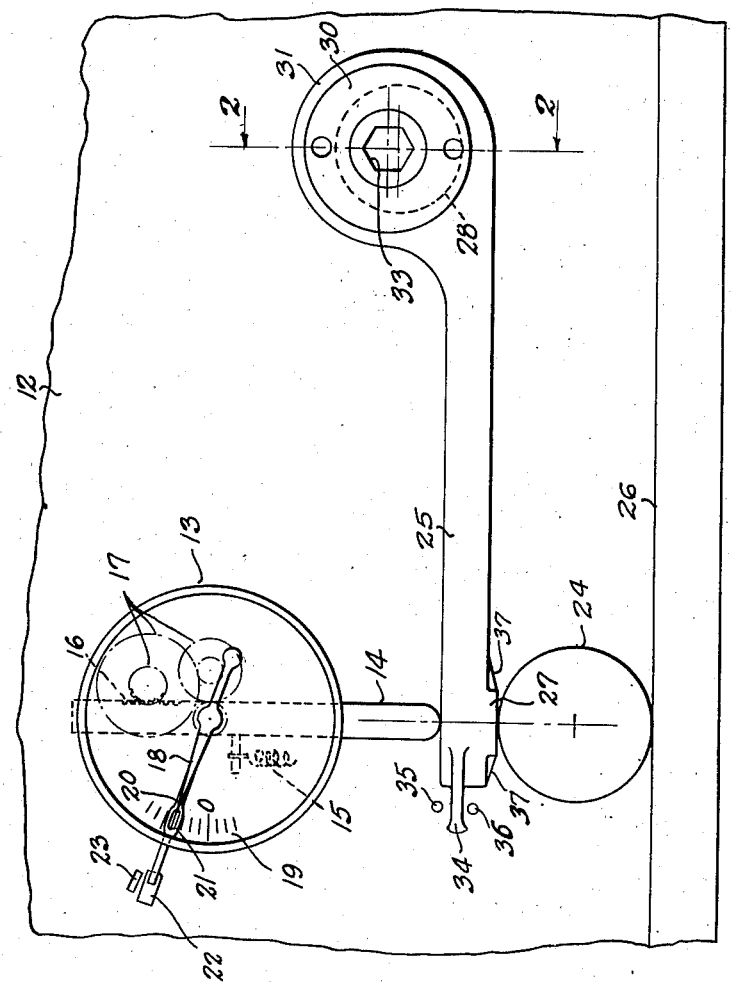
Fig. 1 is a side elevation showing the device in use as a gauging means.

Referring to Figs. 1 and 2, the device includes a back plate 12 on which may be mounted any suitable type of gauging or measuring device or mechanism 13, such for example as a typical gear type dial gauge which has over a good many years of use proven to be extremely durable and accurate. A satisfactory type of this gauging or measuring device is illustrated somewhat diagrammatically and comprises a movable measuring stem 14 guided for vertical sliding movement and projecting from the housing in position to be affected by the element to be gauged. A spring 15 tends to shift it toward the element and this stem includes a rack 16 operating through a gear train 17 to shift an indicating arm 18, the gearing being such as to step up or amplify the movement of the stem 14 to give a much larger movement of the indicating arm. This arm may move over a suitable indicating dial 19 and have a pointer 20 and a zero setting slot 21 to indicate when it is in zero or any other position over the dial. It may also carry a member or templet 22 adapted to move over a slot 23 between the photoelectric cell and a light source (not shown) to at the proper position cut off or interrupt the light beam to control action of the cell in operating an indicating or sorting device or the like, such for example as described in my copending application Serial No. 479,239, and designated as Case A, filed of even date herewith.

The measuring stem 14 in this improved arrangement does not directly engage the element or member 24 being gauged or measured, as is the ordinary operation in gauging with such devices, but located between the stem 14 and the element 24 is a pivoted gauging arm 25 extending substantially parallel to the gauge bed 26 forming an abutment or support for the element 24 to retain it in gauging position and along which the article may be shifted to and from the gauging position. On the under side of the arm 25 is an anvil 27 having a straight flat surface to engage the article 24 and which is ground and lapped to accurate dimensions. This gauge arm is mounted for free swinging movement on an eccentric 28 mounted on the plate 12. This eccentric is mounted on the plate by a mounting screw 29 on which the eccentric may be adjusted to raise or lower the pivoted end of the arm 25 to adjust it relative to the abutment 26 and by which the eccentric may then be locked in the adjusted position, but the eccentric and arm are so constructed that when the eccentric is so locked the arm 25 is free to swing on the eccentric. In the simple arrangement shown the eccentric includes an outer flange 30 of larger diameter than the eccentric 28 to retain the arm 25 on the eccentric, this arm having an enlarged head 31 which embraces the eccentric, and as shown in Fig. 2, is somewhat narrower than the distance between the flange 30 and the plate 12 so that the arm is free to swing on the eccentric at its pivot. The flange 30 may be provided with spanner sockets 32 to receive prongs of a spanner wrench by which the eccentric may be turned on the screw 29 to adjust its position thereon. The screw has a noncircular socket 33 to receive a similarly shaped wrench for turning the screw. After loosening the screw the eccentric may be rotated by a wrench in the recesses 32 to the desired position to properly adjust the arm 25, as will later be described, and then clamped in this position by tightening the screw 29. The arm 25 may have an extension 34 between suitably located stops 35 and 36 to limit extreme movements of the arm 25. There may be inclined walls 37 at the opposite sides of the anvil 27 to facilitate movement or feeding of the articles 24 to the gauging position and their removal therefrom.

Certain factors make the accurate gauging of round parts extremely difficult with the usual gauging methods. Errors are easily made where the measuring and gauging stem 14 directly engages the round element 24 being gauged. When this piece is placed with its center exactly in line with a line drawn through the longitudinal center line of the gauging or measuring stem 14 it is in the only position in which the resulting gauging will be absolutely accurate, because if the piece 24 is moved either to the right or left of this position, then the curvature of its outer periphery will permit the stem 14 to move downwardly a certain amount, depending on the amount of lateral movement of the piece, and will give an inaccurate reading on the dial of the measuring device. Thus if the vertical center line 38 of the piece 24 is only .0144 inch (which is less than 1/64 inch) laterally of the center line 39 of the measuring stem 14, an error of .0002 inch will be present in the reading of the gauge or measuring device, while if the vertical center line is spaced .020 inch laterally of the center of the measuring stem, as shown at 42, the error will be .0004 inch. When it is considered that innumerable elements, such for example as ball bearing races and similar devices are held to tolerances as close as .0001 inch or even closer, it can well be appreciated how difficult it is for an operator to inspect the items without error, as every piece must be carefully centered under the gauge or measuring stem within less than 1/64 of an inch to even obtain accuracies of gauge reading within .0002 inch. It will be evident it is impossible for any operator to gauge any great number of pieces in such a device without considerable fatigue and error due to the care that must be exercised in this operation.

Figure 3:
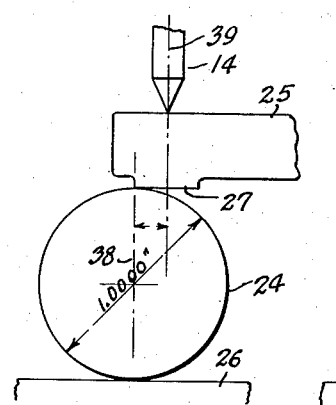
Figure 4:
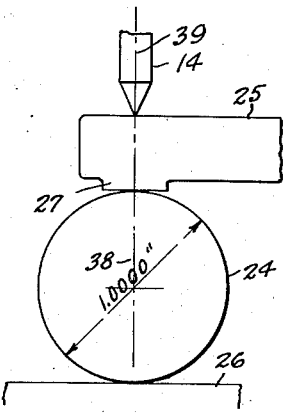
Figure 5:
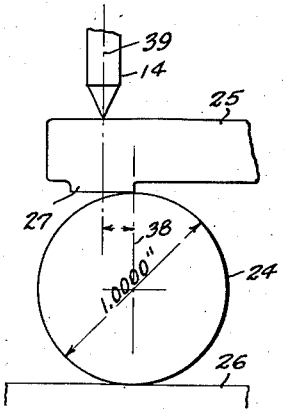

Figs. 3 to 8 illustrate how these difficulties are overcome and the errors largely eliminated with my improved device, and they also show how with this device the close location of the piece being gauged with respect to the center line of the measuring stem is not necessary to secure extreme accuracy. For purposes of illustration, it will be assumed that pieces 24 of one inch basic diameter are to be gauged, with tolerances of plus or minus .0005 inch. In setting the gauge, a master part having a diameter of exactly 1.0000 inch is set under the gauging arm 25, as shown in Fig. 1, and the eccentric 28 turned on its pivot 29 until the gauge arm 25 is so adjusted that no matter where the master part, in this case indicated by the element 24, is rolled or located under the anvil 27, no change will be shown in the reading of the gauging or measuring mechanism 13. When the arm 25 is so adjusted, it simply means that the face of the anvil portion 27 is exactly parallel to the gauge bed or abutment 26, when there is a space of exactly one inch between the anvil and the abutment. It will be understood the face of the anvil portion 27 may be of any length desired, but it should be accurately ground and lapped so that it is perfectly straight and flat. This is shown in Figs. 3 to 5, and it will be seen that the position of the arm 25 in no way changes when the master part, in this case indicated by the element 24, is moved to any position over the anvil. In other words, under these conditions the reading of the gauging or measuring mechanism 13 is the same regardless of where part 24 is placed.

It will therefore be plainly seen that this invention overcomes all the objections previously mentioned in connection with the arrangement where the measuring stem directly engages the round element or piece to be gauged. In other words, with the new arrangement it is not necessary that the vertical center line of the pieces 24 be directly in alignment with the longitudinal center line of the stem 14, but just as accurate reading is secured with the member 24 at any position to the right or left of the center line of the stem, so long as the piece being gauged is within the limits of the surface of the anvil 27. Therefore the operator to secure an accurate reading is not required to accurately locate the piece being gauged directly under the measuring stem, but is required only to see that this piece is between the anvil and the abutment. Because accurate location of the piece with respect to the stem is not required, this device can be readily used for automatic or mechanical feeding of the pieces being gauged to the gauging position, as they do not have to be positioned with any accuracy to give accurate reading of the measuring device 13.

Figure 6:
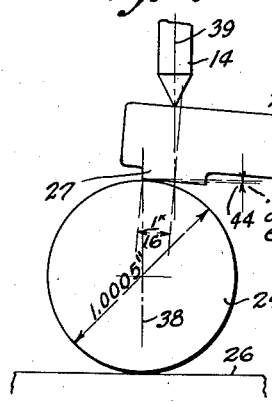
Figure 7:
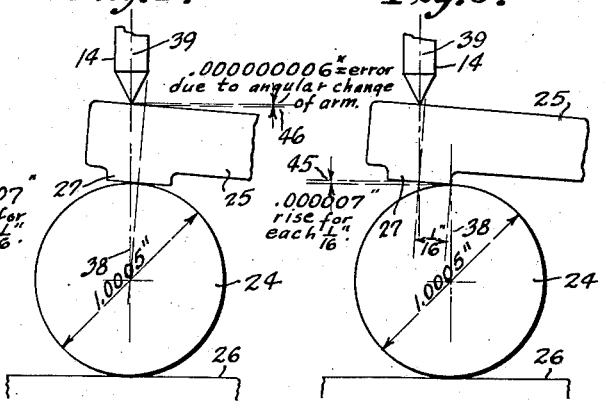
Figure 8:
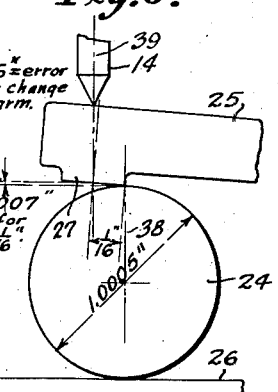

Figs. 6 to 8 illustrate (with the dimensions greatly exaggerated) the extremely small percentage of error present when parts to be gauged having the greatest tolerances allowable as assumed above (plus or minus .0005 inch) are placed under any portion of the anvil within 1/8 of an inch either side of the longitudinal center line 39 of the measuring stem 14, where the length of the arm 25 is approximately 4½ inches.

It will be assumed that an automatic or mechanical feeding device is being used, which is so poorly designed that it cannot locate the piece to be gauged closer than 1/8 of an inch each side of the center 39 of the measuring stem, and that parts 24 to the extreme high tolerance of plus .0005 inch each are being fed to the gauging mechanism. As these pieces are somewhat oversize, the free end of the arm 25 will be raised and the arm will assume a slight angle, which is exaggerated in Figs. 6, 7 and 8. Fig. 6 shows that, due to the very small angle that the arm 25 assumes due to the plus .0005 inch oversize of the element 24, an error of only .000007 inch (seven millionths of an inch) as shown at 44 will be caused in the gauge reading if the part 24 is fed 1/8 inch to the left of the center line of the measuring stem 14. Similarly, an error of seven millionths of an inch will be caused if the part 24 is fed or located 1/8 of an inch to the right of the center of the measuring stem, as shown at 45 in Fig. 8. This means that a feeding mechanism can be so inaccurate as to allow a variation of as much as 1/8 of an inch in the positioning of the parts for the gauging operation, and have only a maximum of seven millionths of an inch error. It will also be evident that with hand feeding the operator is only required to locate the part being gauged within 1/16 of an inch either side of the center line of the measuring stem to cause the maximum of seven millionths of an inch error.

If the error is considered in percentage of the size of the part being gauged it would amount to approximately .0007 per cent (seven ten-thousandths of one percent) of the total diameter. It must be remembered that these errors are based on the part being gauged as positioned 1/16 of an inch off center of the measuring stem 14, and that as its positioning approaches this center the error approaches zero. Also if the length of the arm 25 is greater, the error will be less.

Briefly then, with the dimensions assumed, a part that measures 1.0005 inch in size will indicate a size of 1.000507 inches on the measuring device or gauge if the part is out of position 1/16 of an inch either side of the center line of the measuring stem, which as described above is only seven millionths of an inch over its actual size, which for this type of work is negligible.

Fig. 7 shows the negligible error (indicated at 46) amounting to .000000006 (six billionths of an inch) due to the slight shifting of the measuring stem 14 along the arm 25 as the angle of the arm changes due to the .0005 inch oversize of the part 24 to be gauged.

It will thus be seen from the above that this device permits very accurate gauging of the parts without requiring accurate locating of the parts with respect to the center line of the measuring stem. Also that because of this an operator may gauge a large number of parts without appreciable fatigue and with minimum error, as the care required to be exercised is greatly reduced over that required in the use of devices where the gauging stem directly engages the work piece. Furthermore, because extreme accuracy in locating the parts being gauged is not required, this device is well adapted for automatic or mechanical feeding of the round parts to the gauging position. This permits much faster and accurate gauging of round parts both in hand feeding and mechanical or automatic feeding, thus greatly increasing production as well as accuracy.

Having thus set forth the nature of my invention, what I claim is:

1. A gauging device for round articles comprising a support for the article to be gauged, a pivoted arm extending substantially parallel to said support and provided with a flat anvil surface to engage the top of an article on said support, a pivotal support for said arm comprising an eccentric spaced laterally from said anvil surface, a bearing on the arm embracing the eccentric, means for mounting the eccentric for turning movements about a center spaced from the center of the eccentric so that the pivot for the arm may be shifted to locate the anvil surface parallel with the support, means for clamping the eccentric in adjusted positions, and a measuring device controlled by said arm.

2. A gauging device for round articles comprising a support for the article to be gauged, a pivoted arm extending substantially parallel to said support and provided with a flat anvil surface to engage the top of an article on said support, a pivotal support for said arm spaced laterally from said anvil surface comprising an eccentric mounted to turn about an axis spaced laterally from the center of the eccentric, a bearing on the arm embracing the eccentric, means for securing the eccentric in adjusted positions, a measuring stem engaging the arm on the opposite side from the anvil surface, and an indicating means controlled by said stem.

3. A gauging device comprising a flat support for the article to be gauged, a pivoted arm extending substantially parallel to said support and provided with a flat anvil surface parallel to the support and arranged to engage the article on the opposite side thereof from the support, said arm being also provided with an inclined surface at one side of the anvil surface and leading thereto to guide the article to said surface, a movable member engaging the arm to be positioned thereby and a measuring device controlled by said member.

EUGENE F. MARTINEC.